United States Patent [19]

Wuest et al.

[11] Patent Number: 5,711,614
[45] Date of Patent: Jan. 27, 1998

[54] CRANKSHAFT BEARING OF A MULTICYLINDER INTERNAL COMBUSTION ENGINE

[75] Inventors: Johannes Wuest, Weissach-Flacht; Dieter Nowak, Weilheim; Herbert Ampferer, Sachsenheim; Michael Muddemann, Weissach, all of Germany

[73] Assignee: Dr. Ing. h.c.F. Porsche AG, Weissach, Germany

[21] Appl. No.: 725,815

[22] Filed: Oct. 7, 1996

[30] Foreign Application Priority Data

Oct. 6, 1995 [DE] Germany ............... 19537192.5

[51] Int. Cl.$^6$ ............... F02F 7/00; F16C 9/02
[52] U.S. Cl. ............... 384/429; 123/195 R; 384/403; 384/432
[58] Field of Search ............... 384/288, 291, 384/294, 403, 404, 429–434; 74/605; 123/195 R, 185 A, 195 C, 196 R

[56] References Cited

U.S. PATENT DOCUMENTS

| | | |
|---|---|---|
| 1,398,170 | 11/1921 | Bignan. |
| 4,497,292 | 2/1985 | Hayashi et al. ............... 384/429 X |
| 4,520,770 | 6/1985 | Ogawa ............... 384/429 X |
| 4,693,216 | 9/1987 | Ampferer et al. ............... 123/195 R |
| 5,054,442 | 10/1991 | Pietsch et al. ............... 384/429 X |
| 5,243,937 | 9/1993 | Imagawa ............... 123/195 R |

FOREIGN PATENT DOCUMENTS

| | | |
|---|---|---|
| 0 038 560 | 10/1981 | European Pat. Off. . |
| 395540 | 3/1909 | France . |
| 643652 | 4/1937 | Germany . |
| 34 26 208 | 3/1980 | Germany . |
| 161917 | 5/1933 | Switzerland . |

*Primary Examiner*—Thomas R. Hannon
*Attorney, Agent, or Firm*—Evenson, McKeown, Edwards & Lenahan, P.L.L.C.

[57] ABSTRACT

The crankshaft bearing of a multicylinder internal combustion engine has an upper and a lower bearing part, as well as upper and lower bearing brackets with bearing bores connected therewith, in which brackets the main bearing pins of a crankshaft are mounted. The main bearing pins of the crankshaft are supplied with lubricant through oil grooves in the bearing bores. In order to guide the oil escaping from the bearing locations, which oil is flung-off by the rotating crankshaft cheeks, oil grooves are provided on the lateral surfaces of the bearing brackets. The groves are open on their radial interiors and drain downward in the installed position. This prevents severe foaming of the oil, since the oil flung-off the crankshaft can be captured directly and guided. The residence time of the oil in the crank chamber is reduced so that the oil flows more rapidly back into the oil pan and churning losses are reduced.

28 Claims, 3 Drawing Sheets

CRANKSHAFT BEARING OF A MULTICYLINDER INTERNAL COMBUSTION ENGINE

BACKGROUND AND SUMMARY OF THE INVENTION

The invention relates to a crankshaft bearing of a multicylinder internal combustion engine and, more particularly, to a crankshaft bearing for a multicylinder internal combustion engine with an upper bearing part and a lower bearing part, as well as upper and lower bearing brackets connected therewith, and with lubricating oil feeds that terminate in the bearing surfaces of the bearing brackets.

A crankshaft bearing of the above-mentioned type is known, for example, from German patent document DE 34 26 208 C1 (corresponding to U.S. Pat. No. 4,693,216). In the area of the bearing bush or main bearing pin of the crankshaft, crankshafts bearings of this type are provided with an at least partially circumferential oil groove in the bearing bush or the bearing bore. This oil groove is connected in a known fashion by a bore in the bearing bridge with the oil supply of the internal combustion engine, in order to lubricate the rotating crankshaft during operation, especially its main bearing pins and, indirectly, the connecting rod pins. The lubricant guided in the oil groove is forced during operation of the internal combustion engine by the applied oil pressure into the gap between the bearing bore and the crankshaft pin, and emerges at the edge of the bearing bore. There, it is entrained by the rotating cheeks of the crankshaft and sprayed radially or tangentially. This spraying or flinging of the lubricant that escapes from the bearing points causes a significant vorticization of the oil and, in the final analysis, results in a severe foaming or enrichment with air. In addition, the sprayed or flung oil is kept out of an oil reservoir located, as a rule, underneath the crankshaft bearing chamber for a very long time because of its extensive distribution throughout the crankshaft chamber. As a result, the quantities of oil required for safe operation of the internal combustion engine must be relatively high in order to ensure a sufficient oil level in the reservoir in all operating states, especially during transverse and lengthwise accelerations. The severe oil foaming that occurs as a result of the flinging and considerable atomization of the oil simultaneously results in a considerable loss of quality of the lubricant, or else it requires costly measures in order to lower the air content of the oil and ensure safe functioning of the hydraulically actuated components. The large required oil quantities and the large amount of air admitted into the oil result in significant losses of efficiency and/or increased fuel consumption. This is because large quantities of lubricant are raised through the operating temperature and have to be kept in circulation. This is undesirable, firstly for energy reasons and, secondly, because the increased requirements for environmental acceptability of internal combustion engines and/or automobiles make the use of large quantities of oil unacceptable.

There is therefore needed an improved crankshaft bearing such that excessive foaming of the oil is prevented, and such that at the same time, the time period during which the flung or vorticized oil remains within the crankshaft bearing or the crankshaft chamber is reduced. Therefore, smaller quantities of oil will suffice for the operation of the internal combustion engine and, the oil-air mixture that enters the oil reservoir will contain a much smaller quantity of air.

This goal is achieved according to the present invention by a crankshaft bearing for a multicylinder internal combustion engine with an upper bearing part and a lower bearing part, as well as upper and lower bearing brackets connected therewith, and with lubricating oil feeds that terminate in the bearing surfaces of the bearing brackets. At least one oil groove is formed, at least partially surrounding the bearing brackets, on the lateral surfaces. The groove is open on its radial interior. The oil groove has a drain that is at the bottom in the installed position.

By providing oil grooves on the lateral surfaces of the bearing brackets, the oil that is flung radially and/or tangentially from the cheeks of the crankshaft can be captured and guided. Distribution throughout the entire crank chamber is largely prevented. By making these oil grooves open downward, effective trapping, guidance, and guided delivery of the captured oil into the oil reservoir (oil pan) can be ensured. As a result, the residence time of the oil in the crankshaft chamber is reduced so that the oil that escapes from the bearing points reaches the oil reservoir faster and thus is available more rapidly to the internal circuit of the internal combustion engine. Therefore, the engine can operate with smaller quantities of oil.

At the same time, the capture and guidance of the oil largely prevents or reduces foaming, so that an improvement regarding lubricating properties and the delivery properties of the oil can also be achieved in this respect. This is important for the function of hydraulic components such as the tappets with valve-play adjusting devices, chain tensioners, etc. The guidance of the oil that is flung against the crank cheeks is especially effective when the oil grooves are formed in the two bearing brackets that belong together and are connected together. As a result, the oil can be captured over a large circumferential area and conducted away. Oil guidance is especially favorable when the oil grooves extend over a circumferential area of 270° or more.

The oil grooves can be produced at relatively low cost, for example by grinding, if they have an approximately trapezoidal cross section. At the same time, this cross section ensures a good and efficient guidance.

The walls of the oil grooves are advantageously made integral with the bearing brackets. This is especially advantageous when the bearing parts are made, for example, of aluminum alloy castings.

The oil guidance and/or the conducting away of the oil that is flung off the crank cheeks is especially effective when the oil grooves surround the crank cheeks of the crankshaft at least partially in the axial direction. Providing the oil grooves as close as possible to the connecting rod is advisable in order to keep the area that is not covered as small as possible. The quantity of oil that can get past the oil grooves into the free crank chamber is thus kept low.

It is also advantageous for the distance of the oil grooves from the rotational circumference of the crankshaft cheeks to be kept as small as possible, but without going below a minimum distance of about 4 mm. This also ensures that the quantity of oil that gets past the oil grooves into the crank chamber is small as well.

Other objects, advantages and novel features of the present invention will become apparent from the following detailed description of the invention when considered in conjunction with the accompanying drawings.

DETAILED DESCRIPTION OF THE DRAWINGS

Figure 1:
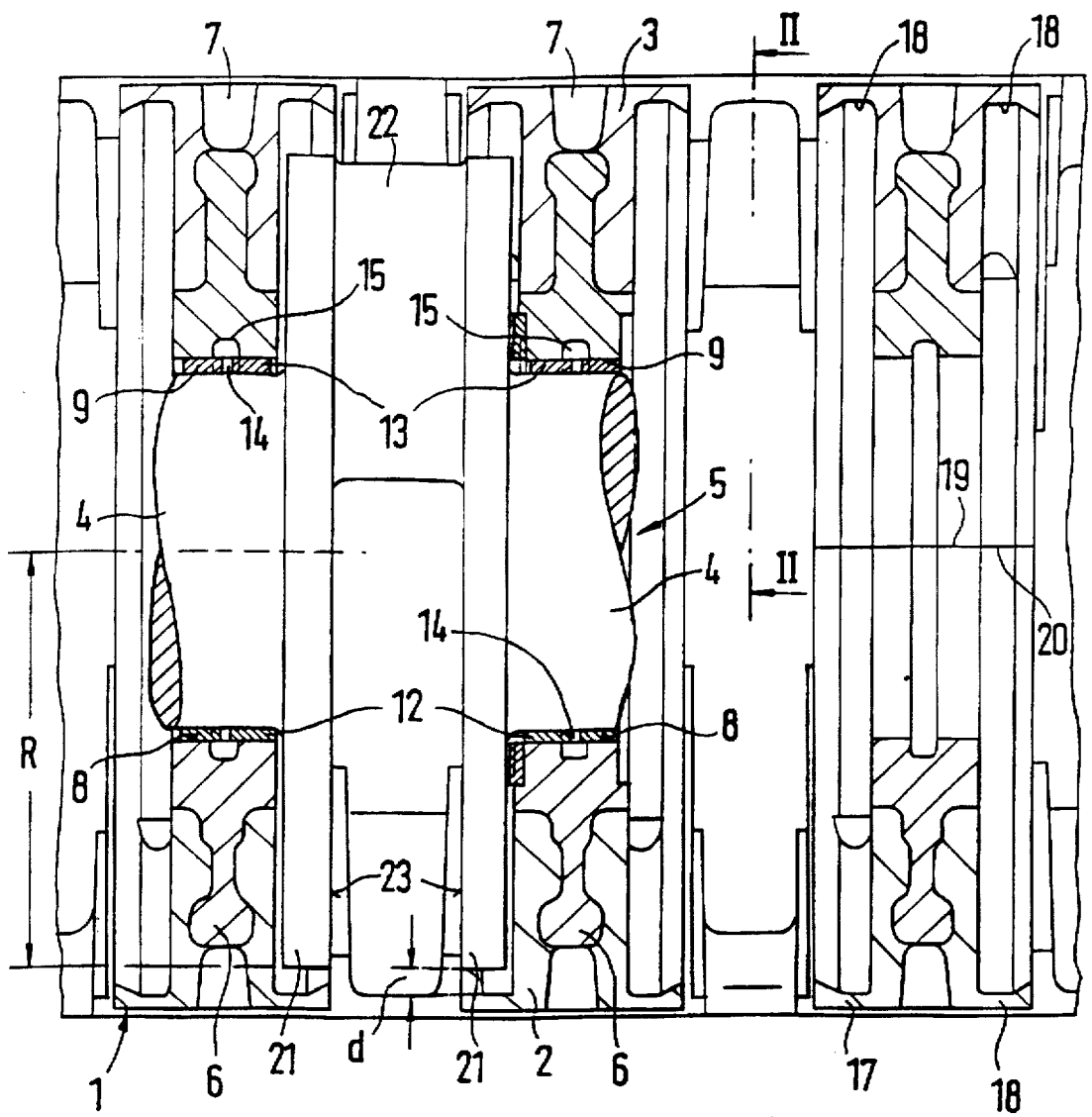
FIG. 1 shows a partial lengthwise section view through a crankshaft bearing, with a crankshaft likewise shown only partially.
Figure 2:
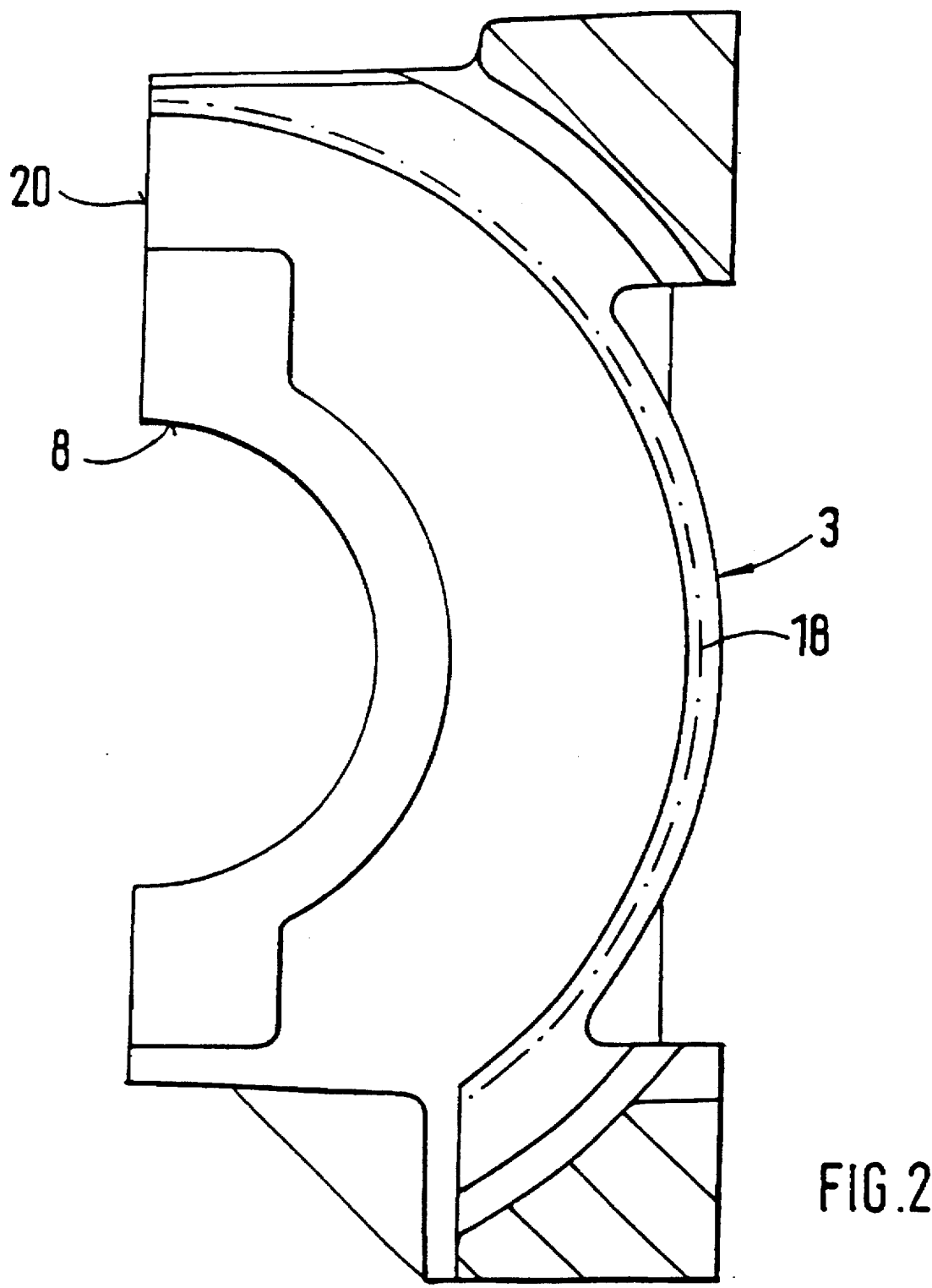
FIG. 2 is a cross section through a bearing part of the crankshaft bearing taken along line II—II in FIG. 1.
Figure 3:
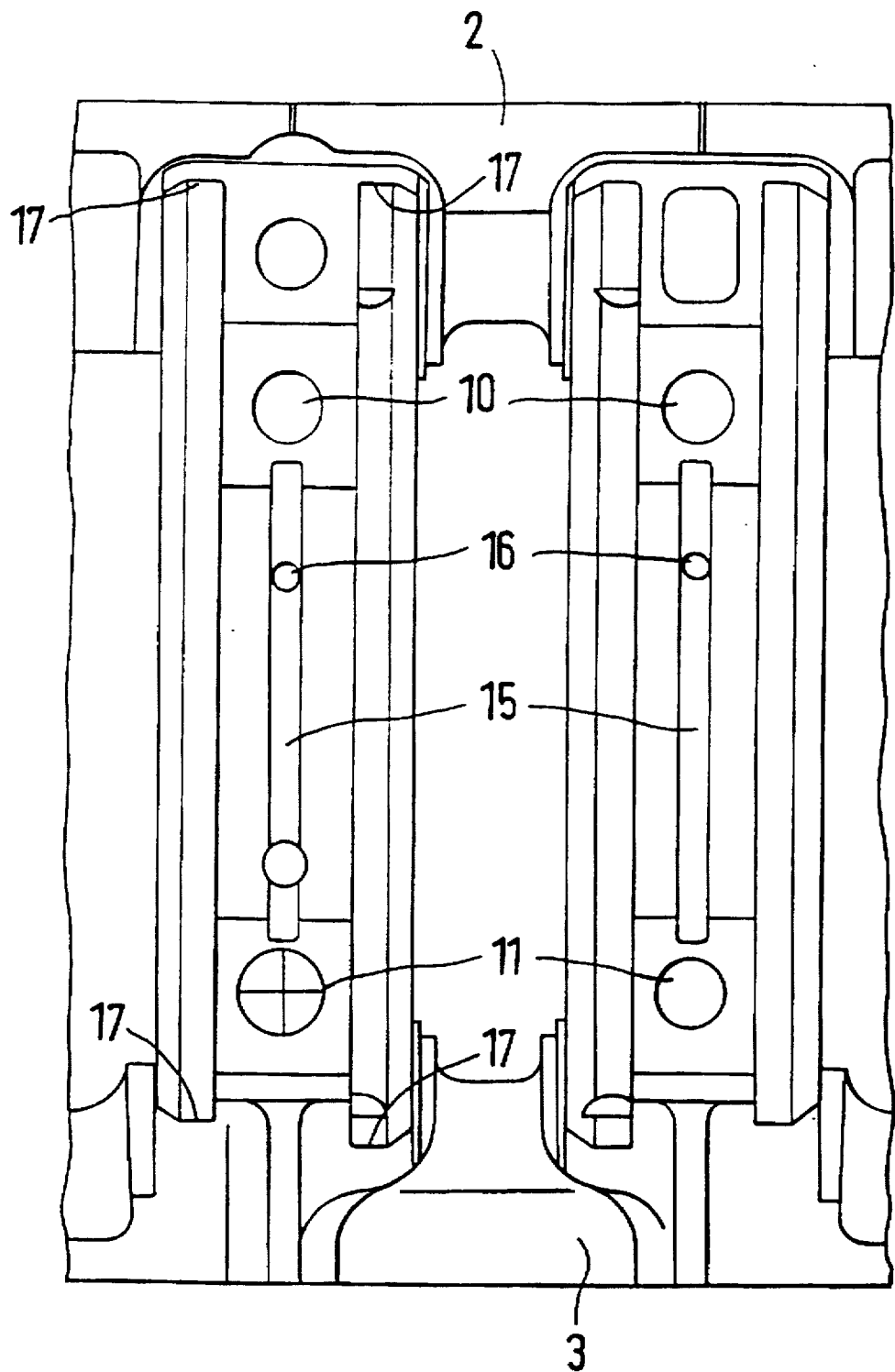
FIG. 3 is a top view of the flange surface of a bearing part.

Referring to the figures, the crankshaft bearing shown in this embodiment comprises a bearing frame with bearing brackets that is provided to improve the rigidity of a crank housing, known of itself, for an internal combustion engine. The bearing frame in this embodiment is designed for use in an internal combustion engine of the horizontally-opposed piston design, but application to internal combustion engines with an in-line or V cylinder arrangement is readily possible.

Bearing frame 1 consists of a ladder-shaped bearing upper part 2 and a likewise ladder-shaped bearing lower part 3. Each part 2, 3 has one bearing bracket 6, 7 with a bearing bore 8, 9 for each main bearing pin 4 of the crankshaft 5. The brackets 6, 7 are located opposite one another and permanently connected together by bearing bolts (not shown). The bearing bolts are arranged in flush bores 10, 11. The bearing bores 8, 9 are provided with semicircular bearing shells 12, 13 in which holes 14 are provided that are connected with a circumferential annular groove 15 in the bearing bores. This annular groove 15 is connected with the oil supply of the internal combustion engine by a bore 16 that terminates in the annular groove 15.

Projections 17, 18 in the form of circular segments are formed on the lateral surfaces of the bearing brackets 6, 7. In the disclosed embodiment, the projections extend over a circumferential area of approximately 145° beginning at the upper part of a flange area 19, 20. Projections 17, 18 are beveled inward in the vicinity of their free ends, so that they form a groove that opens radially inward, in other words their cross sections are approximately trapezoidal. Projections 17, 18 form an oil groove and run at a relatively short distance d from the rotational circumference of crank cheeks 21 having radius R. Projections 17, 18 surround the crank cheeks 21 of the crankshaft 5 in the axial direction and extend approximately up to the extension of the interior 23 of the crank cheeks 21 that faces the respective connecting rod pins 22.

As stated above, bearing frame 1 shown in this embodiment is provided for installation in an internal combustion engine of the horizontally-opposed piston type. Flange areas 19, 20 of the two bearing parts (upper bearing part 2, lower bearing part 3) run vertically when the cylinders are arranged horizontally, so that the oil grooves connected with one another form a circular ring that is open at the bottom. The oil that is guided into the oil grooves during operation of the internal combustion engine can thus escape downward and flow along a relatively short path into an oil pan that is located under the bearing frame (but is not shown in greater detail).

The design of the oil grooves is not limited to the shape of the crankshaft bearing shown and described here. It is also possible to integrate the upper bearing part with the upper bearing bracket directly into the crank housing. The lower bearing part, as shown, can be designed as a ladder-shaped bearing point. It is also possible to design the lower bearing part with the associated bearing brackets in the form of individual bearing caps.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A crankshaft bearing for a multicylinder internal combustion engine having an upper bearing part and a lower bearing part, as well as upper and lower bearing brackets connected therewith, and with lubricating oil feeds that terminate in bearing surfaces of said upper and lower bearing brackets, wherein at least one oil groove is formed on lateral surfaces of said bearing brackets so as to at least partially surround said bearing brackets, said at least one oil groove having its opening facing radially inward, wherein said at least one oil groove has a drain arranged at a bottom in an installed position.

2. The crankshaft bearing according to claim 1, wherein said at least one oil groove is formed in an approximately circular shape and has a diameter which is only slightly larger than a rotational circumference of crank cheeks of said crankshaft.

3. The crankshaft bearing according to claim 1, wherein said at least one oil groove at least partially surrounds crank cheeks of said crankshaft in an axial direction.

4. The crankshaft bearing according to claim 3, wherein said oil grooves are made in an approximately circular shape and have diameters which are only slightly larger than a rotational circumference of crank cheeks of said crankshaft.

5. The crankshaft bearing according to claim 1, wherein at least one of said upper and lower bearing brackets are formed in at least one of a ladder-shaped upper and lower crankshaft bearing frame.

6. The crankshaft bearing according to claim 5, wherein said oil grooves at least partially surround crank cheeks of said crankshaft in an axial direction.

7. The crankshaft bearing according to claim 5, wherein said oil grooves are made in an approximately circular shape and have diameters which are only slightly larger than a rotational circumference of crank cheeks of said crankshaft.

8. The crankshaft bearing according to claim 1, wherein said at least one oil groove has an approximately trapezoidal cross section.

9. The crankshaft bearing according to claim 8, wherein walls of said oil grooves are made in one piece with said bearing brackets.

10. The crankshaft bearing according to claim 8, wherein at least one of said upper and lower bearing brackets are formed in at least one of a ladder-shaped upper and lower crankshaft bearing frame.

11. The crankshaft bearing according to claim 8, wherein said oil grooves at least partially surround crank cheeks of said crankshaft in an axial direction.

12. The crankshaft bearing according to claim 8, wherein said oil grooves are made in an approximately circular shape and have diameters which are only slightly larger than a rotational circumference of crank cheeks of said crankshaft.

13. The crankshaft bearing according to claim 1, wherein walls of said at least one oil groove are made in one piece with said bearing brackets.

14. The crankshaft bearing according to claim 13, wherein at least one of said upper and lower bearing brackets are formed in at least one of a ladder-shaped upper and lower crankshaft bearing frame.

15. The crankshaft bearing according to claim 13, wherein said oil grooves at least partially surround crank cheeks of said crankshaft in an axial direction.

16. The crankshaft bearing according to claim 13, wherein said oil grooves are made in an approximately circular shape and have diameters which are only slightly larger than a rotational circumference of crank cheeks of said crankshaft.

17. The crankshaft bearing according to claim 1, wherein oil grooves are provided in both of said corresponding upper and lower bearing brackets and are connected with one another.

18. The crankshaft bearing according to claim 17, wherein said oil grooves have an approximately trapezoidal cross section.

19. The crankshaft bearing according to claim 17, wherein walls of said oil grooves are made in one piece with said bearing brackets.

20. The crankshaft bearing according to claim 17, wherein at least one of said upper and lower bearing brackets are formed in at least one of a ladder-shaped upper and lower crankshaft bearing frame.

21. The crankshaft bearing according to claim 17, wherein said oil grooves at least partially surround crank cheeks of said crankshaft in an axial direction.

22. The crankshaft bearing according to claim 17, wherein said oil grooves are made in an approximately circular shape and have diameters which are only slightly larger than a rotational circumference of crank cheeks of said crankshaft.

23. The crankshaft bearing according to claim 17, wherein said oil grooves extend over a circumferential area which is greater than or equal to 270°.

24. The crankshaft bearing according to claim 23, wherein said oil grooves have an approximately trapezoidal cross section.

25. The crankshaft bearing according to claim 23, wherein walls of said oil grooves are made in one piece with said bearing brackets.

26. The crankshaft bearing according to claim 23, wherein at least one of said upper and lower bearing brackets are formed in at least one of a ladder-shaped upper and lower crankshaft bearing frame.

27. The crankshaft bearing according to claim 23, wherein said oil grooves at least partially surround crank cheeks of said crankshaft in an axial direction.

28. The crankshaft bearing according to claim 23, wherein said oil grooves are made in an approximately circular shape and have diameters which are only slightly larger than a rotational circumference of crank cheeks of said crankshaft.

* * * * *